Patented Mar. 9, 1948

2,437,501

UNITED STATES PATENT OFFICE 2,437,501

STABILIZING METHYL-SUBSTITUTED POLYSILOXANES

Charles A. Burkhard, Alplaus, and Winton I. Patnode, Schenectady, N. Y., assignors to General Electric Company, a corporation of New York No Drawing. Application September 28, 1946, Serial No. 700,154

3 Claims. (Cl. 260—607)

The present invention relates to compositions of matter comprising methyl-substituted polysiloxanes which exhibit good resistance to gelation at elevated temperatures, and methods of preparing the same. More particularly, the invention is concerned with a method of retarding gelation at elevated temperatures, for example, at 200° C., of a liquid composition comprising a methyl polysiloxane containing approximately two methyl groups per silicon atom, which method comprises incorporating and intimately dispersing in the said polysiloxane small amounts of ketene $(C_2H_2O)$.

The liquid methyl polysiloxanes stabilized in accordance with the practice of our invention are prepared, for example, by hydrolyzing a dimethyl-substituted dihalogenosilane, for instance, dimethyl dichlorosilane, as illustrated, e. g., by the method disclosed and claimed in Patnode application Serial No. 463,813, filed October 29, 1942, and assigned to the same assignee as the present invention. The methyl groups of these liquid methyl polysiloxanes are attached to the silicon atoms through carbon-silicon linkages.

When a liquid composition comprising a liquid methyl polysiloxane containing an average of about two methyl groups per silicon atom is heated at elevated temperatures (for instance, at 200° to 300° C.) in the presence of air, the liquid polysiloxane will gel after a relatively short period of time. In cases where such liquids are employed, e. g., as lubricating or dielectric media, etc., such a change in properties is highly undesirable. We have now found that the time within which this gelation occurs may be materially extended by incorporating in the liquid methyl polysiloxane a gelation-retarder comprising ketene. The amount of ketene required is very small. Thus, by weight, we may employ from about 0.05 to about 4 or 5 per cent ketene based on the weight of the liquid methyl polysiloxane. Preferably, we employ from about 0.5 to 2 per cent ketene. No particular advantage is obtained by using more than 5 per cent.

Various methods may be employed to introduce the ketene into the polysiloxane. One method comprises bubbling the ketene gas through the liquid methyl polysiloxane for a period ranging, for example, from about 30 minutes to six or more hours, depending on the degree saturation desired of the liquid methyl polysiloxane. Additional retardation against gelation may be obtained by removing from the ketene-treated liquid methyl polysiloxane volatile materials boiling below 160° C.

In order that those skilled in the art may better understand how the present invention may be practiced, the following examples are given by way of illustration and not by way of limitation. All parts are by weight.

Example 1

A liquid dimethyl polysiloxane, i. e. a liquid methyl polysiloxane containing an average of about two methyl groups per silicon atom, was prepared by hydrolyzing one liter of dimethyl dichlorosilane in about four liters of water. The oily layer was separated from the aqueous layer, washed several times with water to remove traces of acid, filtered and dried.

The above-prepared liquid methyl polysiloxane was treated with ketene by bubbling the latter through the oil for about four hours until about 0.6 per cent. by weight, ketene has been absorbed. Samples of the treated and untreated methyl silicone oil (liquid methyl polysiloxane) were heated in a 200° C. oven and the time noted when gelation of the samples occurred. The liquid methyl polysiloxane containing no ketene gelled in about 48 hours at this temperature while the ketene-treated polysiloxane did not gel until after 264 hours.

Example 2

A liquid dimethyl polysiloxane was prepared by hydrolyzing substantially pure dimethyl dichlorosilane in water as was done in Example 1. The oily layer was washed several times with water to remove traces of hydrochloric acid present in the liquid polysiloxane. The liquid polysiloxane was allowed to remain at room temperature for several days. Ketene was bubbled through a sample of this liquid polysiloxane for about 4 hours. A portion of the ketene-treated oil was distilled to remove all volatile matter boiling below 160° C. A sample of the latter material boiling above 160° C., together with an untreated sample and a sample of the ketene-treated (but not distilled) oil, were each placed in a 200° C. oven and the time noted when gelation of the samples occurred. The untreated oil gelled in about 46 hours while the ketene-treated, but not distilled, oil gelled after 96 hours. The sample of the treated oil containing no volatile material boiling below 160° C. did not gel until after 264 hours.

Although polymers of ketene, e. g., diketene and dehydroacetic acid, may also be used to increase the time before liquid methyl polysiloxanes containing an average of about 2 methyl groups per silicon atom will gel, their action is not as effective as ketene itself.

What we claim as new and desire to secure by Letters Patent of the United States is:

1. The method of substantially retarding gelation at elevated temperatures of a liquid methyl polysiloxane containing an average of about two methyl groups per silicon atom, which method comprises incorporating in the said polysiloxane from 0.05 to 5 per cent, by weight, ketene based on the weight of the said polysiloxane.

2. The method of substantially retarding gelation at elevated temperatures of a liquid methyl polysiloxane containing an average of about two methyl groups per silicon atom, which method comprises (1) incorporating in the said polysiloxane from 0.05 to 5 per cent, by weight, ketene based on the weight of the said polysiloxane, and (2) removing from the ketene-treated polysiloxane substantially all volatile matter boiling below 150° C.

3. A composition of matter exhibiting good resistance to gelation at elevated temperatures which comprises (1) a liquid methyl polysiloxane containing an average of about two methyl groups per silicon atom, said methyl groups being attached to the silicon atoms through carbon-silicon linkages and (2) from 0.05 to 5 per cent, by weight, ketene based on the weight of the said liquid polysiloxane.

CHARLES A. BURKHARD.
WINTON I. PATNODE.

REFERENCES CITED

The following references are of record in the file of this patent:

UNITED STATES PATENTS

| Number | Name | Date |
| --- | --- | --- |
| 2,389,802 | McGregor et al. | Nov. 27, 1945 |
| 2,389,803 | McGregor et al. | Nov. 27, 1945 |
| 2,389,804 | McGregor et al. | Nov. 27, 1945 |
| 2,389,805 | McGregor et al. | Nov. 27, 1945 |
| 2,389,806 | McGregor et al. | Nov. 27, 1945 |
| 2,389,807 | McGregor et al. | Nov. 27, 1945 |